United States Patent [19]
Ando

[11] 3,812,807
[45] May 28, 1974

[54] CARGO VESSEL FOR CARRYING LIQUID CARGO

[75] Inventor: Shigemi Ando, Chiba, Japan

[73] Assignee: Mitsui Shipbuilding and Engineering Co. Ltd., Tokyo, Japan

[22] Filed: Dec. 1, 1971

[21] Appl. No.: 203,529

[30] Foreign Application Priority Data
Apr. 14, 1971 Japan.............................. 46-23556

[52] U.S. Cl.................. 114/74 R, 114/78, 114/116
[51] Int. Cl............................................ B63b 25/08
[58] Field of Search.......... 114/74 R, 74 A, 116, 72, 114/73, 78

[56] References Cited
UNITED STATES PATENTS
1,377,222   5/1921   Russell................................ 114/116
3,111,298   11/1963   Gasquet............................ 114/74 R Primary Examiner—George E. A. Halvosa
Assistant Examiner—Edward R. Kazenske
Attorney, Agent, or Firm—Dorfman, Herrell and Skillman

[57]   ABSTRACT

Cargo vessel for carrying liquid cargo provided for preventing outflow of a large amount of cargo oil. The vessel is provided with separating bulkheads for partitioning each subdivision divided by oiltight bulkheads, and each separating bulkhead having a valve for communicating between subdivisions on both sides thereof.

1 Claim, 9 Drawing Figures

CARGO VESSEL FOR CARRYING LIQUID CARGO

The present invention relates to a cargo vessel for carrying liquid cargo having the possibility of polluting the sea.

In these years, great concern has been felt about the pollution of the sea or conflagration over the sea surface owing to the outflow of such cargo in the case of collision or stranding of large cargo vessel. As a preventive measure, it has been proposed to reduce the volume of one subdivision of oil tank by closely disposing the watertight bulkheads.

The present invention has for its object to provide a cargo vessel of which the amount of cargo oil outflow is reduced without increase of the hull weight and outfits.

Figure 1:
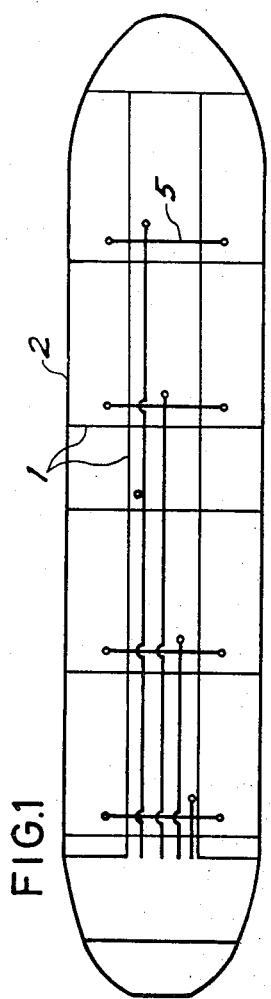
FIG. 1 is a schematic plan view showing the arrangement of tanks of an ordinary tanker.
Figure 2:
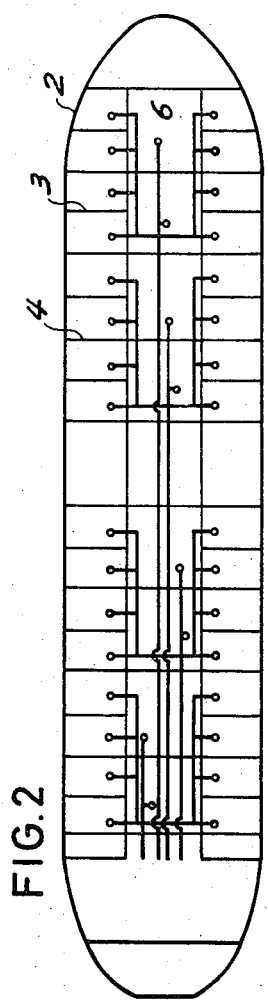
FIG. 2 is a schematic plan view showing the arrangement of tanks in the case that the volume of tanks is restricted by ordinary oiltight bulkheads from the viewpoint of preventing pollution of the sea.

In case the subdivision devided by bulkheads 1 as shown in FIG. 1, though it satisfies the classification society rule and the load line rule on subdivisions in respect to the conventional strength requirement, discharges a large amount of cargo oil excessive from viewpoint of pollution when outside plating is broken, it is proposed to provide a large number of additional wing tank oiltight transverse bulkheads 3 and center tank oiltight transverse bulkheads 4 as shown in FIG. 2. In such a vessel, even if the vessel is knocked by the other vessel at the location of a wing tank transverse bulkhead and cargo oil flows from two subdivisions of the bow and stern sides of the bulkhead, or even if the vessel suffers damage by stranding including at the location of a center tank transverse bulkhead and a part of the cargo oil in the subdivisions of fore and aft side is replaced by sea water, the outflow of oil can be held to a small amount.

In this case, however, the bulkheads 3 and 4 must be designed so as to be bearable with the highest pressure exerted by cargo oil in the severest case, such as the one side is a fully loaded tank and the other side is an empty tank. As a result of such a design, the hull weight increases, on the other hand, the dead-weight capacity decreases. The fittings also increases in proportion to number of tanks if they are to be provided on each tank. For instance, the cargo oil main pipes 5 of the conventional design shown in FIG. 1 become complicated as shown by numeral 6 in FIG. 2. Accordingly, the cost of material and building increases, thereby elevating the price of a ship. The present invention is to overcome such disadvantages.

An embodiment of this invention is hereinafter described referring to the drawings.

Figure 3:
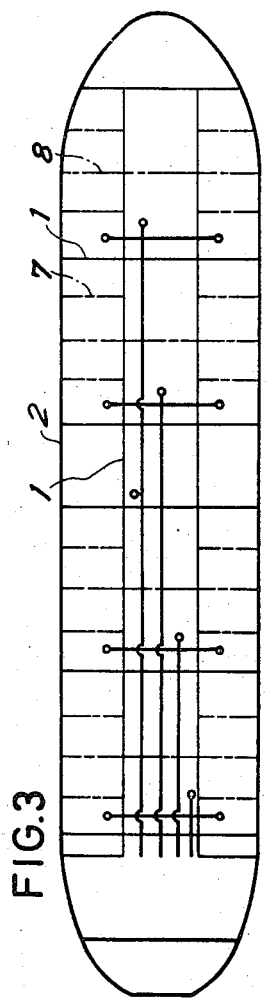
FIG. 3 is a schematic plan view showing the arrangement of tanks according to the present invention.
Figure 4:
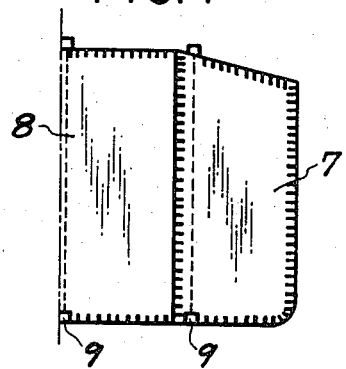
FIG. 4 is an illustration showing a separating bulkhead.

As shown in FIGS. 3 and 4, separating bulkheads 7 and 8 are arranged between oiltight bulkheads 1. Each separating bulkhead has a strength merely enough to prevent mixing of the sea water having flowed thereinto by breakdown of the outside plating with the oil in an adjacent undamaged tank. Each subdivision divided by oiltight bulkheads 1 is provided with a cargo oil main pipe 5 as in the case of FIG. 1, and a communicating valve 9 such as a sluice valve, butterfly valve, oiltight door, or the like is provided at the lower end of each separating bulkhead 7 or 8.

While cargo oil is loaded or unloaded, the communicating valve 9 is opened and closed while navigating in loaded condition. Consequently, the amount of outflow of cargo oil is restricted in the same manner as in the case of FIG. 2 and it is possible to avoid unnecessary heavier structure of the hull and fittings.

Figure 5:
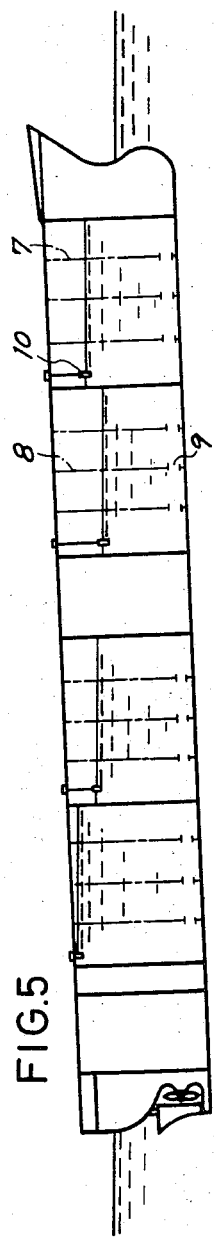
FIG. 5 is a side view showing an unloading condition.

The present invention will be more fully set forth referring to FIGS. 5 to 9. FIG. 5 shows an unloading condition. The oil level at the stem side of the separating bulkhead 7 is necessarily approximately equal to that of the stern side since the communicating valve 9 at the lower end of the separating bulkhead is opened. That is to say, the separating bulkhead is not subjected to pressure. As seen from the drawing, a cargo oil main pipes 5, same as FIG. 1 instance, are enough for the purpose and float gauges 10 for indicating oil level are installed equally in number to FIG. 1.

Figure 8:
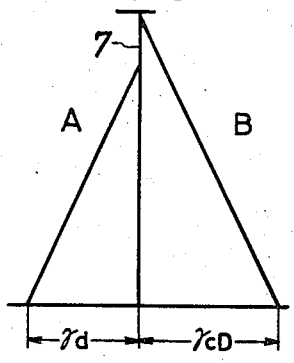
FIGS. 8 and 9 are illustrations explaining the pressure exerted on the separating bulkhead when an outside plating is damaged.
Figure 9:
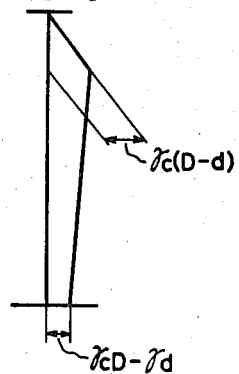
Figure 6:
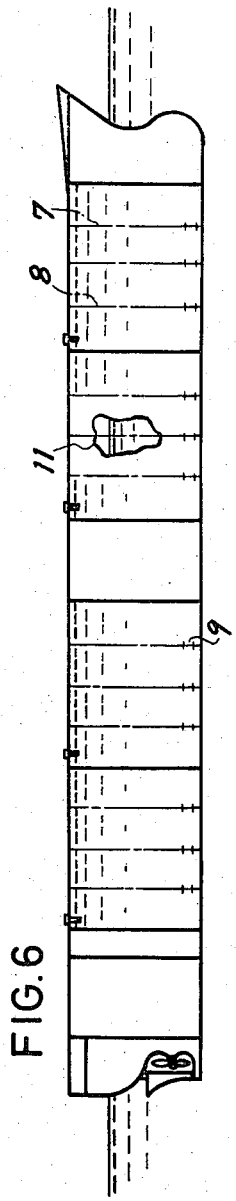
FIG. 6 is a side view illustrating the case that a ship is struck by the other ship and the cargo oil of two subdivisions of the wing tank flows out, sea water being replaced in the subdivisions.

FIG. 6 illustrates the case that the vessel is knocked by the other vessel and the separating bulkhead is broken as shown by 11. In this case, the two subdivisions on both sides of the broken separating bulkhead are replaced by sea water at the same water level with the outside sea water level, while the cargo oil in the two subdivisions flows out. If the draft of the vessel is represented by "$d$," the specific gravity of sea water is "$\gamma$," the depth of oil in the wing tank is "$D$," and the specific gravity of cargo oil is "$\gamma c$," it will be seen that the separating bulkhead 7 located between the damaged subdivision A and the undamaged subdivision B is subject to the cargo oil head of $\gamma cD$ at the bottom on one side and, on the other side, to the sea water head of $\gamma d$ as shown in FIG. 8. These two heads of liquid are substantially balanced at any height of the bulkhead, and a slight remaining water head is as shown in FIG. 9. Generally, $d/D$ is about 0.7 to 0.9 and $\gamma c/\gamma$ is about 0.6 to 1.0. When $d/D$ is 0.8 and $\gamma c/\gamma$ is 0.8, the difference of between both heads at the bottom $\gamma cD - \gamma d$ is zero. At the height of the draft of the vessel, the difference of water head $\gamma c(D-d)$ is $0.8(1-0.8)\ \gamma D$ and hence $0.16\ \gamma D$. Considering that ordinary oiltight bulkhead is designed to bear the water head $\gamma D$ at the bottom of a vessel in view of the fact that such bulkheads are filled with not only cargo oil but also sea water as the ballast, structural strength of the separating bulkhead in accordance with the present invention can be successfully decreased to 16 percent of that of ordinary oiltight bulkhead.

Figure 7:
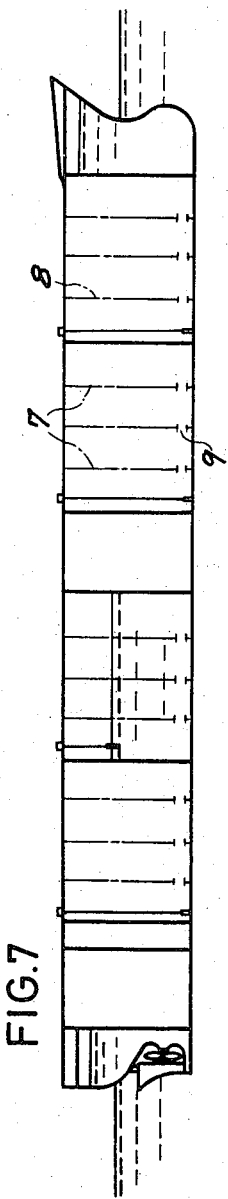
FIG. 7 is a side view showing a heavily ballasted condition as one example of ballasted navigation.

FIG. 7 shows an example of heavily ballasted condition. In this ballasted condition, the communicating valves are opened because there is no neccesity for closing the valves considering the reason why the separating bulkheads are provided.

From the foregoing, according to the present invention, the pollution of the sea can be kept to the minimum in case that the hull of a ship is damaged. Also it is possible to reduce to the minimum the increase of the hull weight and outfit.

What is claimed is:

1. Cargo vessel having a hull for carrying liquid cargo comprising oiltight bulkheads dividing said hull and having a strength to satisfy the structural requirement for the hull, separating bulkheads partitioning subdivisions in the divisions divided by said oiltight bulkheads and having structural strength decreased to substantially less than the strength of said oiltight bulkheads, valves provided at the lower portions of said separating bulkheads for communicating between subdivisions on both sides thereof when the valves are open, said separating bulkheads and valves being operable to prevent mixing of liquid through said separating bulkhead when said valves are closed, cargo oil pipings connecting each subdivision divided by said oiltight bulkheads, means to open said valves during loading and unloading of said subdivisions so as to maintain equal pressures on opposite sides of said separating bulkheads, and to close said valves while navigating in loaded condition, whereby upon rutpure of the hull navigable water is mixed with and displaces from the vessel only the liquid cargo in the subdivision where the hull is ruptured, and said oiltight bulkheads have a strength to confine the liquid cargo in said subdivision when the liquid level on one side of the oiltight bulkhead is at the top of said bulkhead and there is no liquid bearing against the other side of said oiltight bulkhead, and said separating bulkhead has a strength in the range of 16 percent of the strength of the oiltight bulkhead sufficient to confine said liquid cargo when the subdivision on the other side of said separating bulkhead is filled with water to the level of the water outside of the vessel.

* * * * *